US012693051B2

(12) United States Patent
Price et al.

(10) Patent No.: US 12,693,051 B2
(45) Date of Patent: Jul. 28, 2026

(54) LASER COOLING ATOMIC OBJECTS WITH PHONON PUMPING

(71) Applicant: Quantinuum LLC, Broomfield, CO (US)

(72) Inventors: Gabriel Price, Broomfield, CO (US); Brian Vincent Estey, Louisville, CO (US); William Cody Burton, Northglenn, CO (US); David Hayes, Broomfield, CO (US); Michael Feig, Denver, CO (US)

(73) Assignee: Quantinuum LLC, Broomfield, CO (US)

( * ) Notice: Subject to any disclaimer, the term of this patent is extended or adjusted under 35 U.S.C. 154(b) by 366 days.

(21) Appl. No.: 18/469,740

(22) Filed: Sep. 19, 2023

(65) Prior Publication Data

US 2024/0183583 A1      Jun. 6, 2024

Related U.S. Application Data

(60) Provisional application No. 63/417,524, filed on Oct. 19, 2022.

(51) Int. Cl.
*F25B 23/00* (2006.01)
*G06N 10/40* (2022.01)
(52) U.S. Cl.
CPC ........... *F25B 23/003* (2013.01); *G06N 10/40* (2022.01)
(58) Field of Classification Search
CPC ........ F25B 23/003; G21K 1/00; G06N 10/40; G06N 10/20; G06N 10/00
See application file for complete search history.

(56) References Cited

U.S. PATENT DOCUMENTS

| | | |
|---|---|---|
| 10,951,002 B1 | 3/2021 | Bohn et al. |
| 2005/0210886 A1 | 9/2005 | Lynch |

(Continued)

FOREIGN PATENT DOCUMENTS

| | | |
|---|---|---|
| CN | 1957212 A | 5/2007 |
| CN | 114298316 A | 4/2022 |

(Continued)

OTHER PUBLICATIONS

Meng and Du, "Study On the High-Efficiency Sympathetic Cooling of Mixed Ion System with a Large Mass-to-Charge Ratio Difference in a Dual Radio-Frequency Field By Numerical Simulations", The European Physical Journal D, Jan. 21, 2021, 8 pages, vol. 75, No. 19 (Year: 2021).*

(Continued)

*Primary Examiner* — David E Smith
(74) *Attorney, Agent, or Firm* — Alston & Bird LLP

(57) ABSTRACT

A method of performing a quantum gate operation in an ion trap quantum computing system includes identifying one or more error mechanisms that cause a quantum computational error in a quantum gate operation on a first trapped ion of an ion chain comprising a plurality of trapped ions, wherein the quantum gate operation is performed by applying a first Raman laser beam and a second Raman laser beam, computing a first amplitude of the first Raman laser beam, and a second amplitude of the second Raman laser beam such that the effect of the identified one or more error mechanisms is accounted for, and applying the first Raman laser beam having the computed first amplitude and the second Raman laser beam having the computed second amplitude on the first trapped ion to perform the quantum gate operation on the first trapped ion.

20 Claims, 7 Drawing Sheets

(56) References Cited

U.S. PATENT DOCUMENTS

Figure 1:
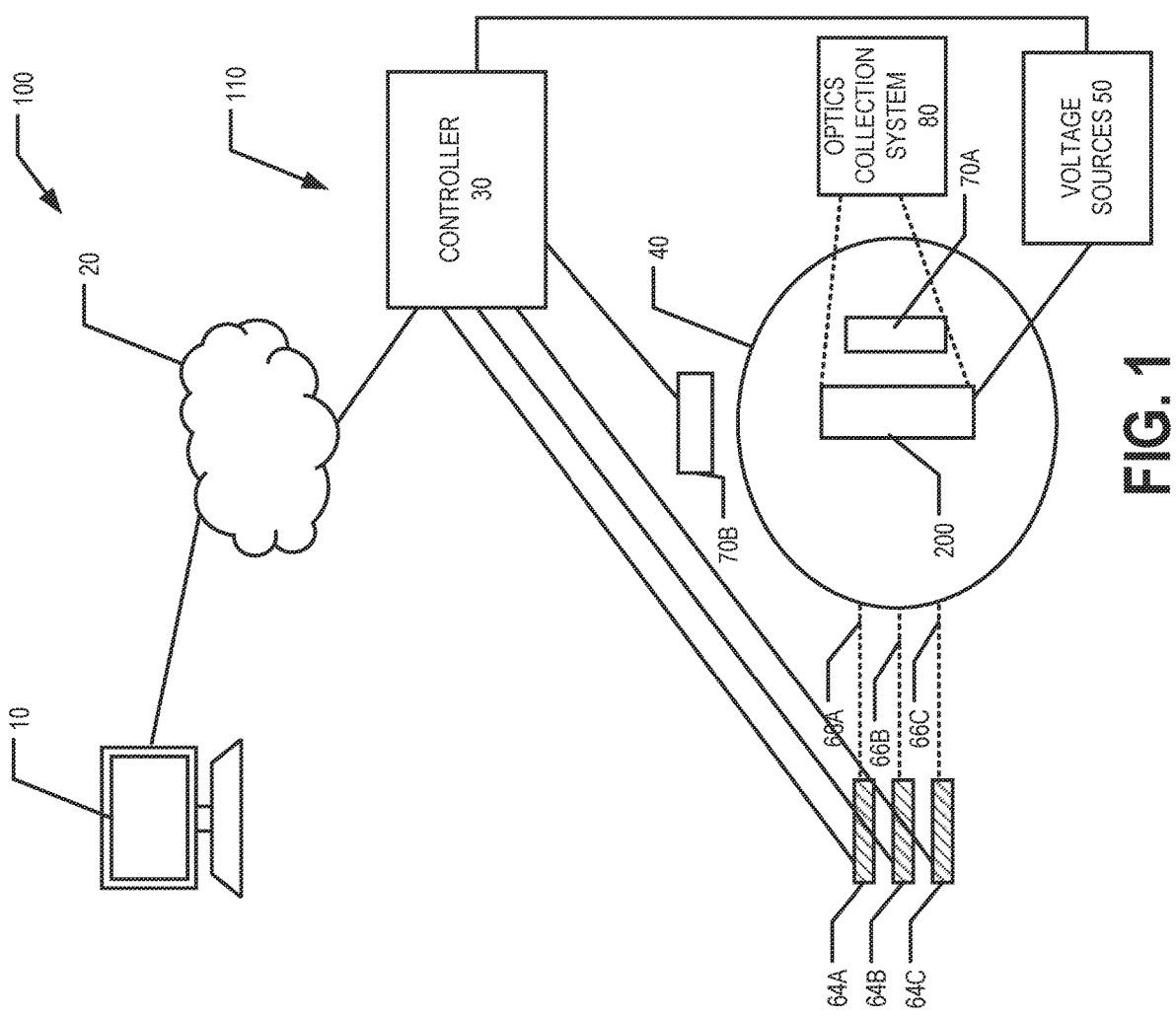

| | | | | |
|---|---|---|---|---|
| 2022/0108202 A1* | 4/2022 | Gaebler | ........... | G06N 10/00 |
| 2022/0136415 A1 | 5/2022 | Neiser | | |

FOREIGN PATENT DOCUMENTS

| | | |
|---|---|---|
| EP | 3982303 A1 | 4/2022 |
| WO | 2020/205037 A1 | 10/2020 |
| WO | 2020/236230 A1 | 11/2020 |
| WO | 2022/066510 A1 | 3/2022 |
| WO | 2022/146577 A2 | 7/2022 |

OTHER PUBLICATIONS

Wright et al., "Scalable Quantum Computing Architecture with Mixed Species Ion Chains", Proceedings of SPIE, Quantum Information and Computation XIII, 2015, vol. 9500, 6 pages (Year: 2015).*

English translation of TW Notice of Allowance dated Jun. 20, 2025 for TW Application No. 112139955, 6 page(s).

TW Notice of Allowance Mailed on Jun. 20, 2025 for TW Application No. 112139955, 6 page(s).

English Translation of TW Office Action, including Search Report dated Dec. 3, 2024 for TW Application No. 112139955, 7 page(s).

TW Office Action, including Search Report Mailed on Dec. 3, 2024 for TW Application No. 112139955, 7 page(s).

Meng, Yansong, et al., "Study on the high-efficiency sympathetic cooling of mixed ion system with a large mass-to-charge ratio difference in a dual radio-frequency field by numerical simulations", The European Physical Journal D, Jan. 21, 2021, 8 pages, vol. 75, No. 19, Springer, Germany.

Outgoing—ISA/210—International Search Report Mailed on Jul. 9, 2024 for WO Application No. PCT/US23/076178, 5 page(s).

Outgoing—Written Opinion of the ISA Mailed on Jul. 9, 2024 for WO Application No. PCT/US23/076178, 8 page(s).

Wright, John, et al., "Scalable quantum computing architecture with mixed species ion chains", Proceedings of SPIE, Quantum Information and Computation XIII (Donkor, et al. Editors), May 21, 2015, 6 pages, vol. 9500, The International Society for Optics and Photonics, US.

Gorman, Dylan J., "Noise sensing and quantum simulation with trapped atomic ions", Dissertation for Doctor of Philosophy in Physics, University of California, Berkeley, Spring 2017, retrieved from the Internet at https://ions.berkeley.edu/publications/dylan_gorman_thesis.pdf on May 1, 2024, 106 pages.

Hou, Pan-Yu, et al., "Coherently coupled mechanical oscillators in the quantum regime", dated Jun. 22, 2022, submitted to Cornell University Library Online Archive on Jun. 19, 2022, available on the Internet at https://arxiv.org/pdf/2205.14841v2, 27 pages.

English Translation of JP Office Action dated Apr. 7, 2026 for JP Application No. 2025522705, 3 page(s).

Gorman, Dylan J., et al., "Two mode coupling in a single ion oscillator via parametric resonance", submitted May 21, 2014 to Cornell University Olin Online Library Archive, retrieved from https://arxiv.org/pdf/1405.5571 on Mar. 26, 2026, 8 pages.

JP Office Action Mailed on Apr. 7, 2026 for JP Application No. 2025522705, 3 page(s).

Sakrejda, Tomasz, et al., "Efficient sympathetic cooling in mixed barium and ytterbium ion chains", submitted Apr. 21, 2021 to Cornell University Olin Online Library Archive, retrieved from the Internet at https://arxiv.org/pdf/1809.00240 on Mar. 26, 2026, 6 pages.

* cited by examiner

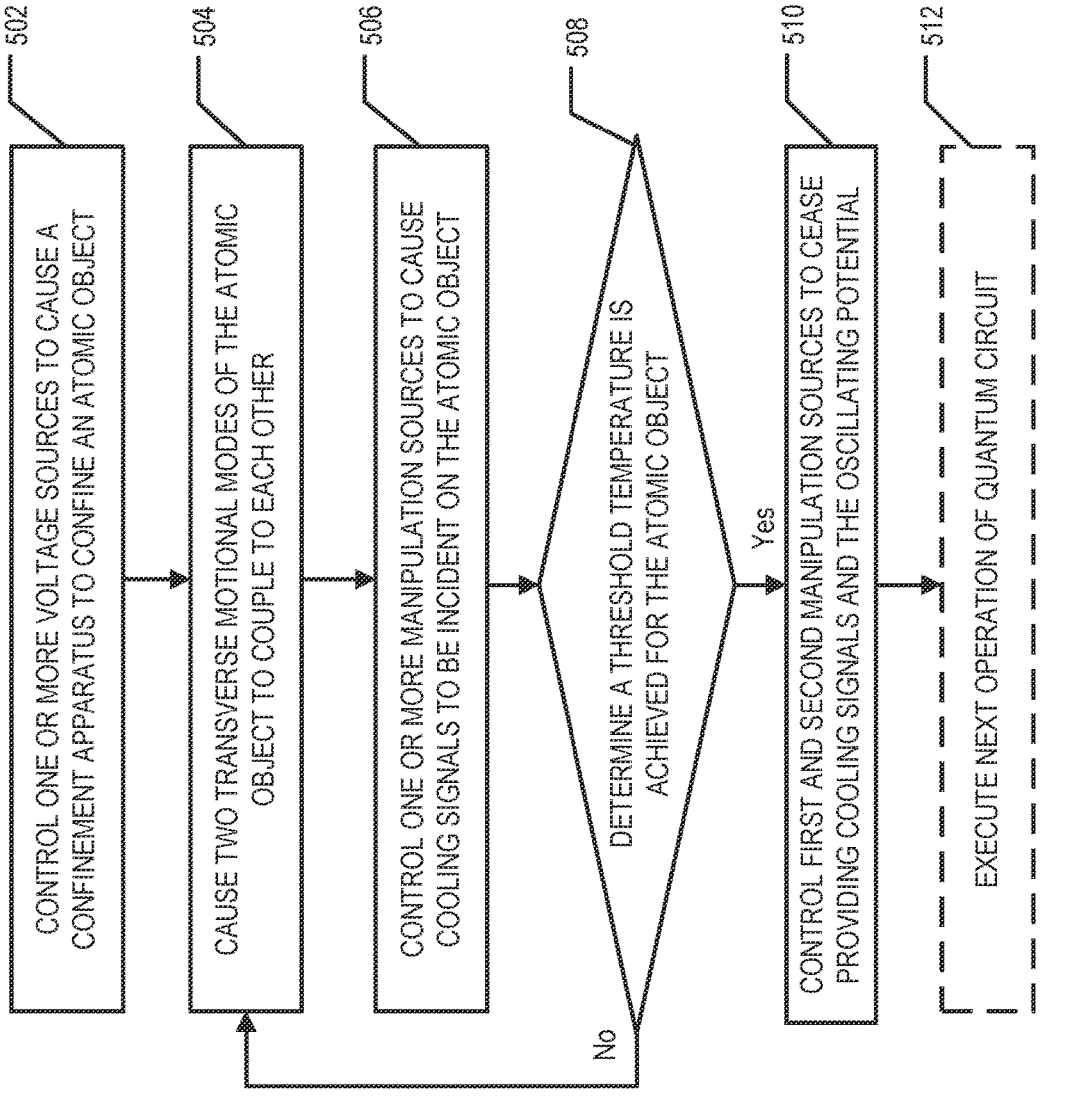

502 — CONTROL ONE OR MORE VOLTAGE SOURCES TO CAUSE A CONFINEMENT APPARATUS TO CONFINE AN ATOMIC OBJECT

504 — CAUSE TWO TRANSVERSE MOTIONAL MODES OF THE ATOMIC OBJECT TO COUPLE TO EACH OTHER

506 — CONTROL ONE OR MORE MANIPULATION SOURCES TO CAUSE COOLING SIGNALS TO BE INCIDENT ON THE ATOMIC OBJECT

508 — DETERMINE A THRESHOLD TEMPERATURE IS ACHIEVED FOR THE ATOMIC OBJECT

No

Yes

510 — CONTROL FIRST AND SECOND MANIPULATION SOURCES TO CEASE PROVIDING COOLING SIGNALS AND THE OSCILLATING POTENTIAL

512 — EXECUTE NEXT OPERATION OF QUANTUM CIRCUIT

FIG. 5

LASER COOLING ATOMIC OBJECTS WITH PHONON PUMPING

CROSS-REFERENCE TO RELATED APPLICATIONS

This application claims priority to U.S. Application No. 63/417,524, filed Oct. 19, 2022, the content of which is incorporated by reference herein in its entirety.

TECHNICAL FIELD

Various embodiments relate to laser cooling of atomic objects confined by an atomic object confinement apparatus. For example, various embodiments relate to increasing a laser cooling rate of atomic objects through the use of phonon pumping.

BACKGROUND

In various scenarios, it is desirable to cool atomic objects trapped by an atomic object trap such that various operations may be performed on the atomic objects (e.g., experiments, controlled quantum evolution, and/or the like). However, in various scenarios, some motional modes of the atomic objects cool very slowly, and thus, the cooling steps of the atomic objects take up a significant fraction of the run time. It is challenging to cool all the motional modes of the atomic objects efficiently. Through applied effort, ingenuity, and innovation many deficiencies of such laser cooling systems have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for increasing a cooling rate through the use of phonon pumping for an atomic object confined by an atomic object confinement apparatus. Various embodiments correspond to a quantum computer, such as a quantum charge-coupled device (QCCD)-based quantum computer, for example, and increasing a cooling rate through the use of phonon pumping for an atomic object confined by an atomic object confinement apparatus. For example, the qubit of the quantum computer may be an atom and/or ion or other quantum particle which may be part of atomic object crystal and/or group. In various embodiments, the atomic object is trapped and/or confined by an atomic object confinement apparatus, such as an ion trap, a surface ion trap, and/or the like.

Various embodiments provide technical solutions to technical problems of laser cooling atomic objects within a confinement apparatus. For example, when cooling the atomic objects, each motional mode needs to be cooled independently and the cooling rates of different motional modes may be very different. The motions of an atomic object may be divided into several motional modes orthogonal to each other. For example, the motions of an atomic object crystal or group consisting of N atomic objects may be divided into 3*N uncoupled modes, whose dynamics may usually be treated independently. In various embodiments, the confinement apparatus defines linear confinement regions and the atomic object crystal(s) confined thereby are linear atomic object crystals. In other words, the atomic objects of the atomic object crystal are disposed in a linear arrangement. Thus, the motional modes of the atomic object crystal may be divided into N axial modes primarily along a direction of a crystal axis (which is generally aligned with a confinement axis defined by the confinement region) and 2*N radial modes perpendicular to the direction of the crystal axis (and/or the confinement axis).

For an example atomic object crystal, the axial motional modes cool much faster than the radial motional modes. However, to cool the atomic objects to near their motional ground state, all the motional modes need to be cooled. The total cooling time is mostly limited by a slowest cooling rate of all the motional modes.

In various embodiments, an oscillating potential is applied to couple at least one motional mode with a slower cooling rate to at least one motional mode with a faster cooling rate, where the slower cooling rate is slower than the faster cooling rate. For example, the oscillating electric potential may have a frequency that equals a frequency difference between the motional states with slower cooling rates and the motional states with faster cooling rates. When the motional mode with the slower cooling rate is coupled to the motional mode with the faster cooling rate, the energy (phonons) may be transferred from the motional state(s) with slower cooling rates to the motional state(s) with faster cooling rates. For example, the energy (phonons) may be transferred from radial motional modes to axial motional modes, such that the atomic object may be cooled approximately at a cooling rate of the axial motional modes. As such, the effective cooling rate of the radial motional modes may be improved and the atomic object may be cooled relatively efficiently.

According to one aspect, a method for cooling an atomic object confined by an atomic object confinement apparatus is provided. In an example embodiment, the method includes controlling one or more voltage sources to cause a confinement apparatus to confine the atomic object at a position defined by the confinement apparatus, the confinement apparatus includes (a) one or more radio frequency (RF) electrodes defining an RF null axis of the atomic object confinement apparatus and (b) a plurality of control electrodes, where the atomic object includes at least two quantum objects, the at least two quantum objects comprising a first component of a first species of the at least two quantum objects and a second component of a second species of the at least two quantum objects, where motion of the atomic object at the position defined by the confinement apparatus includes contributions from one or more radial motional modes of the atomic object and contributions from one or more axial motional modes of the atomic object; causing at least one first control signal to be provided to at least one control electrode of the plurality of control electrodes, where the at least one first control signal causes the at least one control electrode to generate an oscillating potential at the position defined by the confinement apparatus and configured to cause at least one radial mode of the one or more radial modes of the atomic object to couple to at least one axial mode of the one or more axial modes of the atomic object such that motional energy is transferred from the at least one radial motional mode to the at least one axial motional mode, and the oscillating potential has a frequency that equals a frequency difference between the at least one radial motional mode and the at least one axial motional mode; and controlling one or more manipulation sources to cause cooling signals to be incident on the atomic object, where the at least one radial motional mode is dominated by motion of the first component of the first species of the at least two quantum objects and the cooling signals are tuned to cause cooling of the second component of the second species of the at least two quantum objects.

In an example embodiment, the at least one radial mode of the one or more radial modes of the atomic object are dominated by the first species of the atomic object and the at least one axial mode of the one or more axial modes of the atomic object are dominated by the second species of the atomic object.

In an example embodiment, the first component of the first species of the at least two quantum objects is configured for use as a coolant ion in a sympathetic cooling scheme for the atomic object.

In an example embodiment, the first species quantum object is a Yb ion, and the second species quantum object is an Ba ion.

In an example embodiment, the oscillating potential is a pulse oscillating potential, which is configured to cause the at least one radial mode of the one or more radial modes of the atomic object to couple to the at least one axial mode of the one or more axial modes of the atomic object for a period of $\pi$.

In an example embodiment, a sequence of causing at least one first control signal to be provided to at least one control electrode of the plurality of control electrodes and controlling one or more manipulation sources to cause cooling signals to be incident on the atomic object are performed repeatedly until a threshold temperature is achieved for the atomic object.

In an example embodiment, the oscillating potential is a continuous oscillating potential, which is configured to cause the at least one radial mode of the one or more radial modes of the atomic object and the at least one axial mode of the one or more axial modes of the atomic object to hybridize.

In an example embodiment, the at least one radial mode of the one or more radial modes of the atomic object and the at least one axial mode of the one or more axial modes of the atomic object are cooled at a same rate in response to the cooling signals being tuned to cause cooling of the second component of the second species of the at least two quantum objects.

In an example embodiment, controlling one or more manipulation sources to cause cooling signals to be incident on the atomic object and causing at least one first control signal to be provided to at least one control electrode of the plurality of control electrodes are performed simultaneously.

In an example embodiment, controlling one or more manipulation sources to cause cooling signals to be incident on the atomic object and causing at least one first control signal to be provided to at least one control electrode of the plurality of control electrodes are performed until a threshold temperature is achieved for the atomic object.

According to another aspect, an apparatus configured to cause and/or control cooling of an atomic object confined by an atomic object confinement apparatus is provided. In an example embodiment, the apparatus includes at least one processor and memory storing computer-executable instructions. The computer-executable instructions are configured to, when executed by the at least one processor, cause the apparatus to control one or more voltage sources to cause a confinement apparatus to confine the atomic object at a position defined by the confinement apparatus, the confinement apparatus includes (a) one or more radio frequency (RF) electrodes defining an RF null axis of the atomic object confinement apparatus and (b) a plurality of control electrodes, where the atomic object includes at least two quantum objects, the at least two quantum objects comprising a first component of a first species of the at least two quantum objects and a second component of a second species of the at least two quantum objects, where motion of the atomic object at the position defined by the confinement apparatus includes contributions from one or more radial motional modes of the atomic object and contributions from one or more axial motional modes of the atomic object; cause at least one first control signal to be provided to at least one control electrode of the plurality of control electrodes, where the at least one first control signal causes the at least one control electrode to generate an oscillating potential at the position defined by the confinement apparatus and configured to cause at least one radial mode of the one or more radial modes of the atomic object to couple to at least one axial mode of the one or more axial modes of the atomic object such that motional energy is transferred from the at least one radial motional mode to the at least one axial motional mode, and the oscillating potential has a frequency that equals a frequency difference between the at least one radial motional mode and the at least one axial motional mode; and control one or more manipulation sources to cause cooling signals to be incident on the atomic object, where the at least one radial motional mode is dominated by motion of the first component of the first species of the at least two quantum objects and the cooling signals are tuned to cause cooling of the second component of the second species of the at least two quantum objects.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides block diagram of an example atomic object quantum computer, in accordance with an example embodiment.

Figure 2:
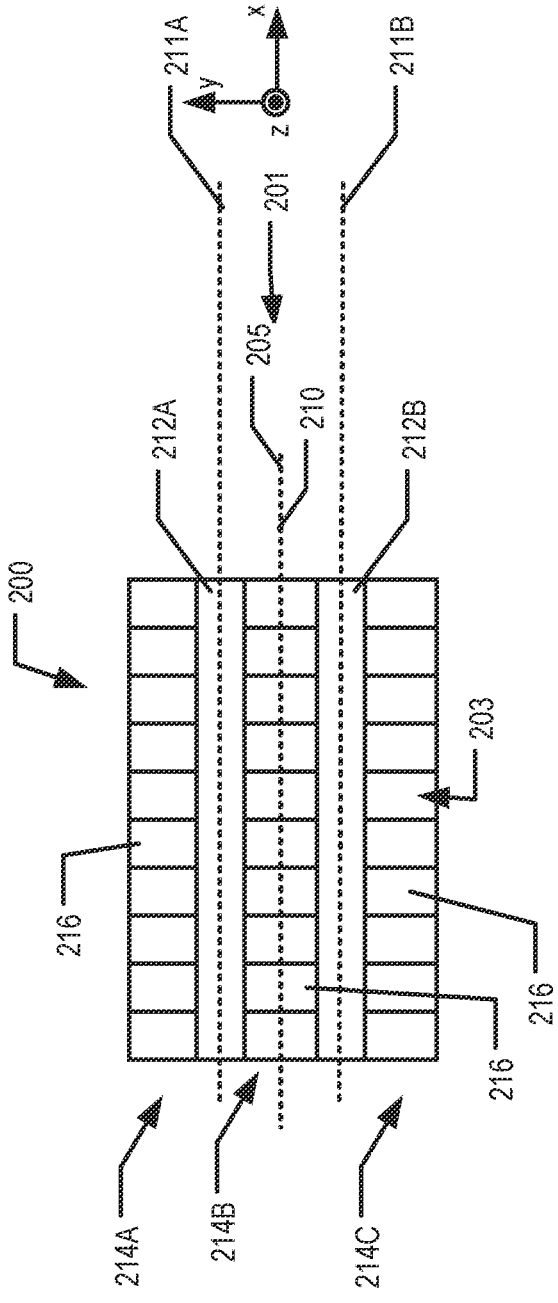

FIG. 2 provides a top view of an example atomic object confinement apparatus that may be used in example embodiment.

Figure 3:
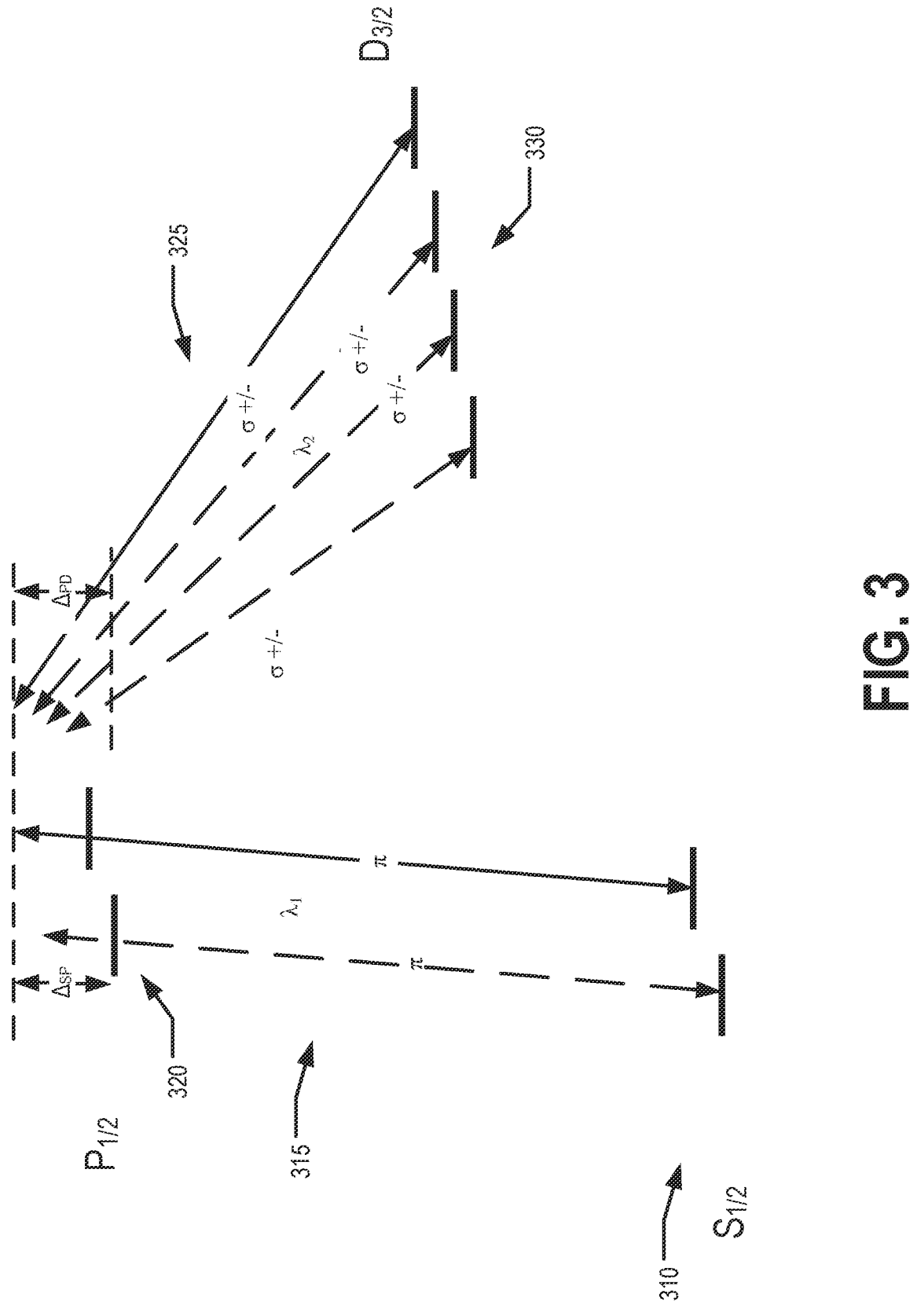

FIG. 3 provides a level diagram of a component of an atomic object illustrating performance of a cooling operation, in accordance with an example embodiment.

Figure 4:
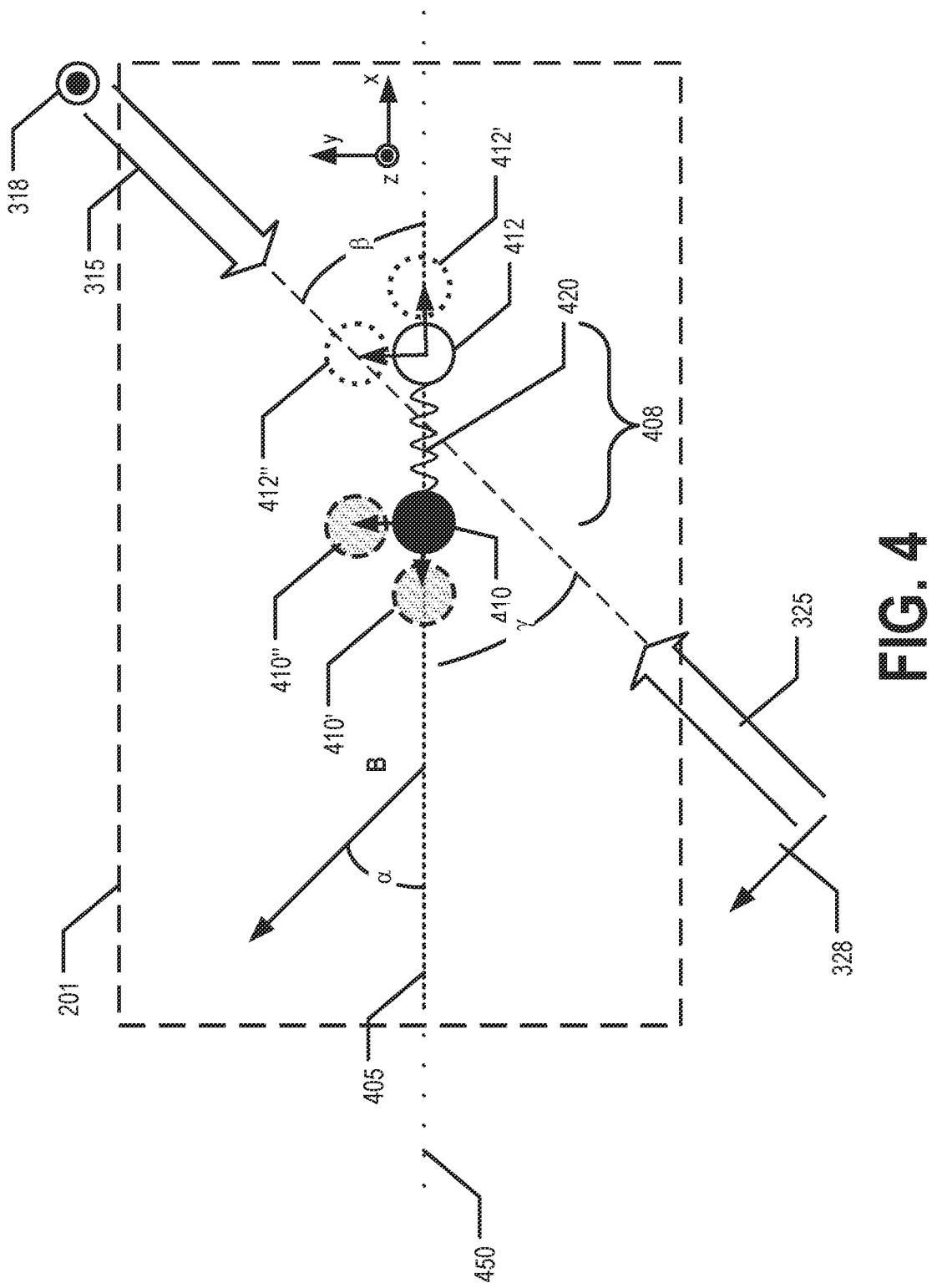

FIG. 4 provides a schematic diagram illustrating performance of a cooling operation through the use of phonon pumping, in accordance with an example embodiment.

FIG. 5 provides a flowchart illustrating various processes and/or procedures of a cooling operation through the use of phonon pumping, in accordance with an example embodiment.

Figure 6:
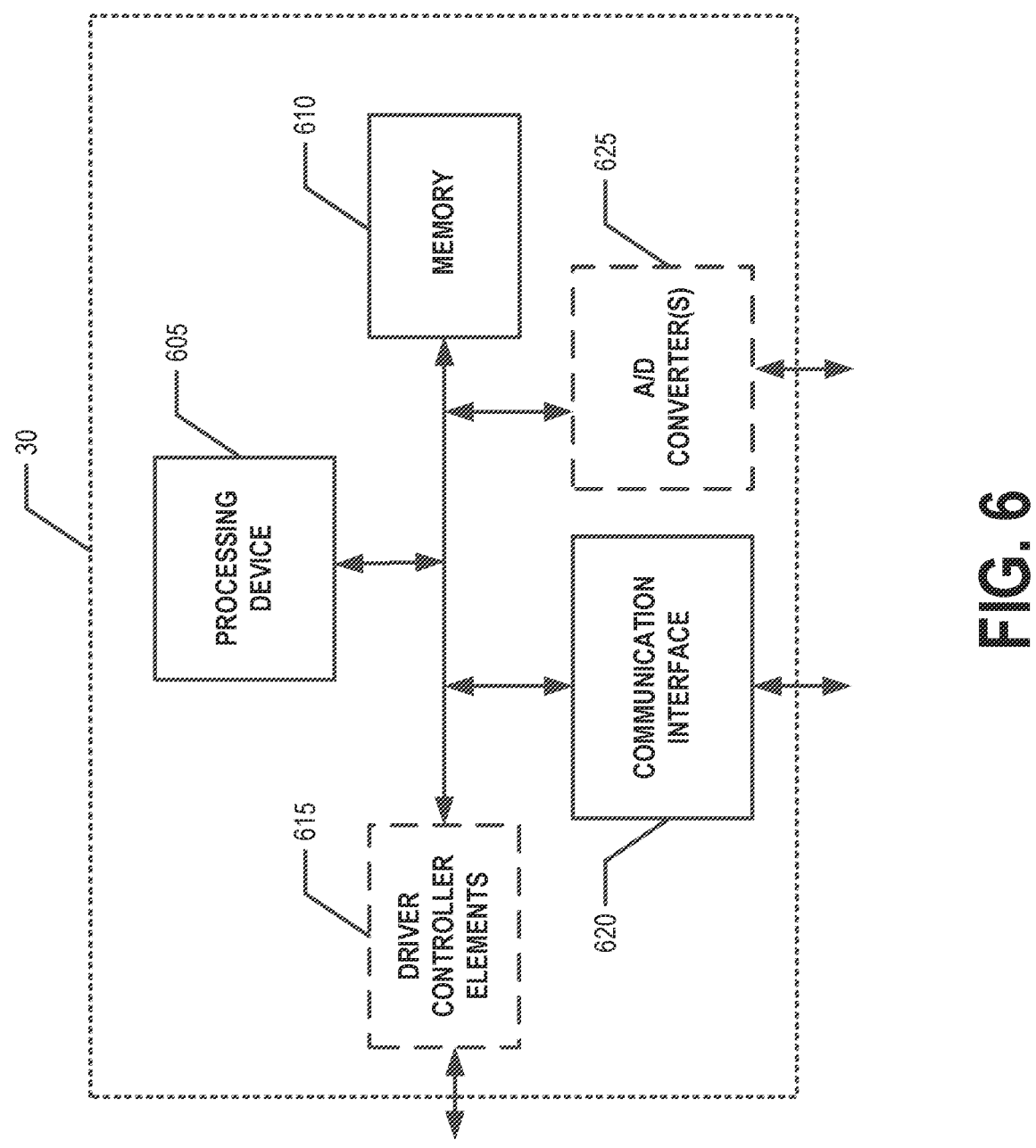

FIG. 6 provides a schematic diagram of an example controller of a quantum computer comprising an atomic object confinement apparatus configured for confining atomic objects therein, in accordance with an example embodiment.

Figure 7:
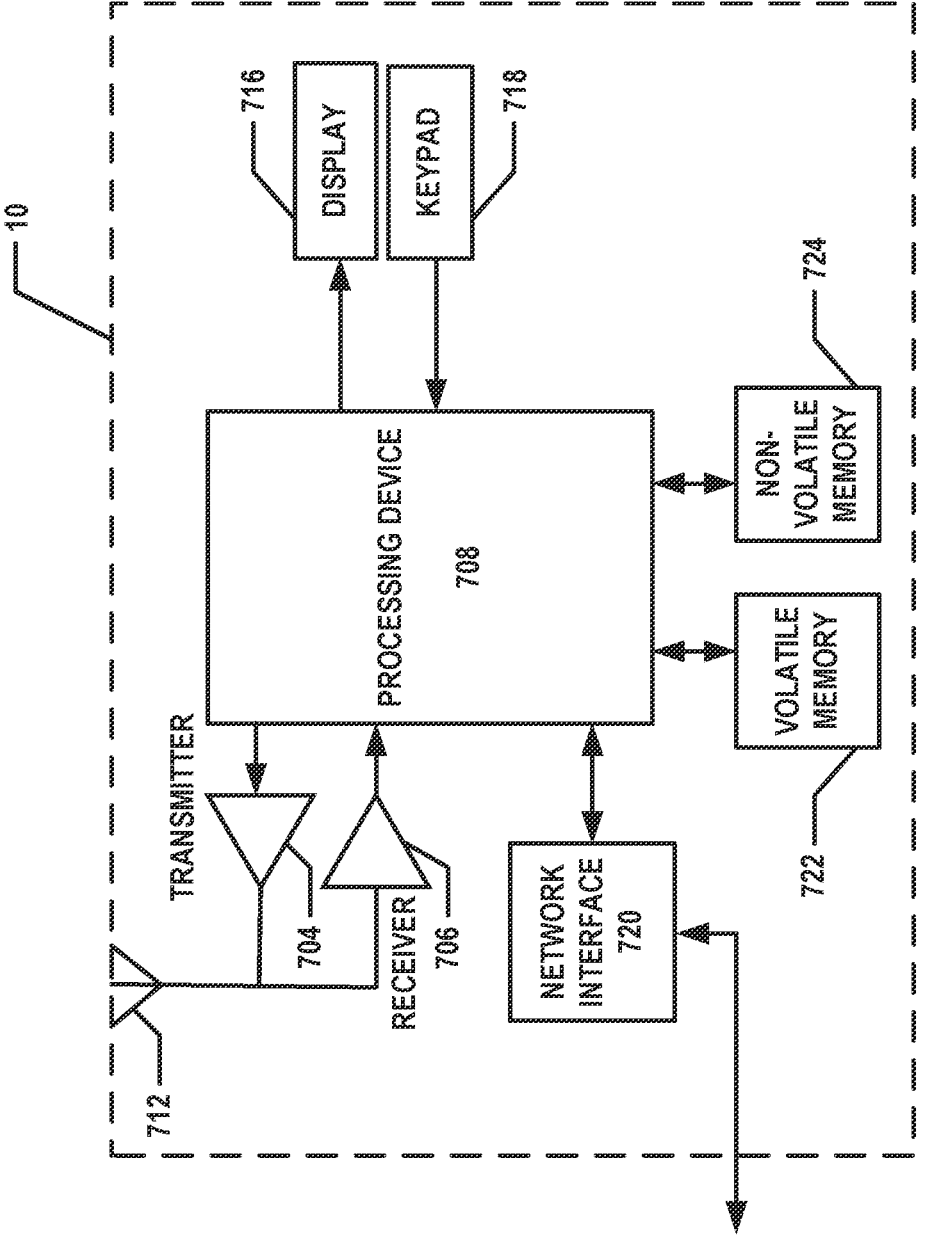

FIG. 7 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within applicable engineering and/or manufacturing tolerances and/or within user measurement capabilities, unless otherwise indicated. Like numbers refer to like elements throughout.

In various scenarios, atomic objects are confined by an atomic object confinement apparatus. In various embodiments, the atomic object confinement apparatus is an ion trap, such as a surface ion trap, Paul ion trap, and/or the like. In various embodiments, the atomic objects are ions, atoms, ion crystals, atomic crystals, and/or the like. In an example embodiment, an atomic object may include two or more ions where a first component of the atomic object are one or more ions of a first atomic type (e.g., a first chemical element, an ion of a first atomic number, and/or the like). In an example embodiment, the atomic object comprises two or more ions where a second component of the atomic object are one or more ions of a second atomic type (e.g., a second chemical element, an ion of a second atomic number, and/or the like). In an example embodiment, the first component of the atomic object (e.g., the ions of the first atomic object type) is one or more qubit ions for use as qubits of a quantum computer. In an example embodiment, the second component of the atomic object (the ions of the second atomic type) is one or more cooling ions for use in a sympathetic cooling scheme for the atomic object. In an example embodiment, the first component of the atomic object and the second component of the atomic object are ions of a same atomic type.

In various embodiments, the atomic objects confined by the atomic object confinement apparatus are used to perform experiments, controlled quantum state evolution, quantum computations, and/or the like. In various embodiments, in order for the atomic objects confined by the atomic object confinement apparatus to be used to perform the experiments, controlled quantum state evolution, quantum computations, and/or the like, the atomic objects need to be at a low temperature and/or cooled near the motional ground state for the atomic objects and/or the components thereof. In various embodiments, laser cooling is used to reduce the motional energy of the atomic objects and/or components thereof. For example, in an example embodiment, the first components of the atomic objects are cooling ions used to sympathetically cool qubit ions and the second components of the atomic objects are the qubit ions used as qubits of a quantum computer.

Typical types of laser cooling include Doppler cooling, resolved sideband cooling, and EIT cooling. Doppler cooling includes cooling atomic objects via an optical transition that is broad compared to the atomic objects motional transition. An atomic object's motional (secular) frequency is the frequency with which the atomic object oscillates in response to a confining potential and/or pseudopotential of the atomic object confinement apparatus, such as that generated by applying a radio frequency voltage signal to a radio frequency electrode and/or rail of a Paul surface ion trap, for example. EIT cooling includes applying two laser fields and a magnetic field to the atomic object. The laser fields are detuned from respective transitions of the first component of the atomic object. Cooling occurs when stronger photon absorption occurs on the red-detuned motional sidebands compared to the blue-detuned motional sidebands.

However, when cooling the atomic objects, each motional mode has a different cooling rate (e.g., due to the motional modes each having a respective frequency corresponding thereto) and the cooling rates of different motional modes may be very different. The motions of an atomic object can be divided into several motional modes orthogonal to each other. For example, the motions of an atomic object crystal or group consisting of N atomic objects may be described by 3*N uncoupled modes, whose dynamics may usually be treated independently. In various embodiments, the confinement apparatus defines linear confinement regions and the atomic object crystal(s) confined thereby are linear atomic object crystals. In other words, the atomic objects of the atomic object crystal are disposed in a linear arrangement. Thus, the motional modes of the atomic object crystal may be divided into N axial modes primarily along a direction of a crystal axis (which is generally aligned with a confinement axis defined by the confinement region) and 2*N radial modes perpendicular to the direction of the crystal axis (and/or the confinement axis).

For example, the axial motional modes may cool much faster than the radial motional modes. But more than one motional mode needs to be cooled before any gate operations are performed on the atomic objects. The total cooling time can be limited by the slowest cooling rate of all the motional modes. In various embodiments, the energy (phonons) may be transferred from motional modes with slower cooling rates to motional modes with faster cooling rate, such that the motional modes with the slower cooling rates may be cooled at the faster cooling rate. As used herein, the term slower cooling rate refers to a cooling rate that is slower than at least the faster cooling rate. Similarly, the term faster cooling rate refers to a cooling rate that is faster than at least the slower cooling rate.

In various embodiments, an oscillating potential may be applied to couple the motional modes with slower cooling rates to the motional modes with faster cooling rates. For example, the oscillating potential may have a frequency equals a frequency difference between the motional states with slower cooling rates and the motional states with faster cooling rates. The energy (phonons) may be transferred from the motional states with slower cooling rates to the motional states with faster cooling rates.

In various embodiments, the oscillating electric potential may take the form of a pulse and couple the motional modes with slower cooling rates to the motional modes with faster cooling rates for a certain duration of time (e.g., one π time, which is defined as a duration of time need to completely swap phonons between one motional mode (e.g., a radial mode) to another motional mode (e.g., an axial mode)). The phonon occupation of the motional modes with slower cooling rates may be transferred to the motional modes with faster cooling rates, such that the motional modes with faster cooling rates have low excitation. Cooling light may be applied to the motional modes with faster cooling rates to cool the motional modes with faster cooling rates to cool the atomic objects to its target temperature.

In various embodiments, a sequence of applying the oscillating electric potential and the cooling light may be repeated several times to cool the atomic objects to its target temperature.

Exemplary Quantum Computer Comprising an Ion Trap Apparatus

Laser cooling of atomic objects confined by an atomic object confinement apparatus may be performed in a wide variety of contexts and/or for a wide variety of applications. A phonon pumping function to increase the rate of the laser cooling of atomic objects may be performed by a controller 30 of a quantum computer 110, in various embodiments. FIG. 1 provides a schematic diagram of an example quantum computer system 100 comprising a confinement apparatus 200 (e.g., an ion trap), in accordance with an example embodiment.

In various embodiments, the quantum computer system 100 comprises a computing entity 10 and a quantum computer 110. In various embodiments, the quantum computer 110 comprises a controller 30, a cryostat and/or vacuum chamber 40 enclosing a confinement apparatus 200, one or more manipulation sources 64 (e.g., 64A, 64B, 64C), one or more voltage sources 50, one or more magnetic field generators 70 (e.g., 70A, 70B), an optics collection system 80, and/or the like. In various embodiments, the controller 30 is configured to control the operation of (e.g., control one or more drivers configured to cause operation of) the manipulation sources 64, voltage sources 50, magnetic field generators 70, a vacuum system and/or cryogenic cooling system (not shown), and/or the like. In various embodiments, the controller 30 is configured to receive signals (e.g., electrical signals) generated and provided by the optics collection system 80.

In an example embodiment, the one or more manipulation sources 64 may comprise one or more lasers (e.g., optical lasers, microwave sources and/or masers, and/or the like) or another manipulation source. In various embodiments, the one or more manipulation sources 64 are configured to manipulate and/or cause a controlled quantum state evolution of one or more atomic objects within the apparatus 200. For example, a first manipulation source 64A is configured to generate and/or provide a first manipulation signal and a second manipulation source 64B is configured to generate and/or provide a second manipulation signal, where the first and second manipulation signals are configured to collectively laser cool atomic objects confined by the atomic object confinement apparatus.

In various embodiments, the atomic object confinement apparatus 200 is an ion trap, such as a surface ion trap, Paul ion trap, and/or the like. In various embodiments, the atomic objects are ions, atoms, ion crystals, atomic crystals, and/or the like. In an example embodiment, the atomic objects comprise two or more ions where a first component of the atomic objects are one or more ions of a first atomic type (e.g., a first chemical element, an ion of a first atomic number, and/or the like). In an example embodiment, the atomic objects comprise two or more ions where a second component of the atomic objects are one or more ions of a second atomic type (e.g., a second chemical element, an ion of a second atomic number, and/or the like). In an example embodiment, the first component of the atomic object (e.g., the ions of the first atomic object type) is one or more qubit ions for use as qubits of a quantum computer. In an example embodiment, the second component of the atomic object (the ions of the second atomic type) is one or more cooling ions for use in a sympathetic cooling scheme for the atomic object. For example, in an example embodiment, the atomic object is an ion crystal comprising a singly ionized Ba atom used as a cooling ion and a singly ionized Yb ion used as a qubit ion. In another example embodiment, the atomic object is an ion crystal comprising a singly ionized Yb atom used as a cooling ion and a singly ionized Ba ion used as a qubit ion.

In an example embodiment, the one or more manipulation sources 64 each provide a manipulation signal (e.g., laser beam and/or the like) to one or more regions of the atomic object confinement apparatus 200 via corresponding beam paths 66 (e.g., 66A, 66B, 66C). In various embodiments, at least one beam path 66 comprises a modulator configured to modulate the manipulation signal being provided to the apparatus 200 via the beam path 66. In various embodiments, the manipulation sources 64, modulator, and/or other components of the quantum computer 110 are controlled by the controller 30.

In various embodiments, the quantum computer 110 comprises one or more voltage sources 50. For example, the voltage sources may be arbitrary wave generators (AWG), and/or other voltage signal generators. For example, the voltage sources 50 may comprise a plurality of longitudinal voltage drivers and/or voltage sources and/or at least one RF driver and/or voltage source. The voltage sources 50 may be electrically coupled to the corresponding potential generating elements (e.g., longitudinal electrodes 416 and/or RF electrodes 412) of the confinement apparatus 200, in an example embodiment.

In various embodiments, the quantum computer 110 comprises one or more magnetic field generators 70 (e.g., 70A, 70B). For example, the magnetic field generator may be an internal magnetic field generator 70A disposed within the cryogenic and/or vacuum chamber 40 and/or an external magnetic field generator 70B disposed outside of the cryogenic and/or vacuum chamber 40. In various embodiments, the magnetic field generators 70 comprise permanent magnets, Helmholtz coils, electrical magnets, and/or the like. In various embodiments, the magnetic field generators 70 are configured to generate a magnetic field at one or more regions of the atomic object confinement apparatus 200 that has a particular magnitude and a particular magnetic field direction in the one or more regions of the atomic object confinement apparatus 200.

In various embodiments, the quantum computer 110 comprises an optics collection system 80 configured to collect and/or detect photons (e.g., stimulated emission 120) generated by qubits (e.g., during reading procedures). The optics collection system 80 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits (e.g., atomic objects) of the quantum computer 110. In various embodiments, the detectors may be in electronic communication with the quantum system controller 30 via one or more A/D converters 1025 (see FIG. 10) and/or the like.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms (e.g., quantum circuits), and/or the like into a computing language, executable instructions, command sets, and/or the like that the controller 30 can understand, execute, and/or implement.

In various embodiments, the controller 30 is configured to control the voltage sources 50, magnetic field generators 70, cryogenic system and/or vacuum system controlling the temperature and pressure within the cryogenic and/or vacuum chamber 40, manipulation sources 64, and/or other systems controlling various environmental conditions (e.g., temperature, pressure, and/or the like) within the cryogenic and/or vacuum chamber 40, configured to manipulate and/or cause a controlled evolution of quantum states of one or more atomic objects within the confinement apparatus, and/or read and/or detect a quantum (e.g., qubit) state of one or more atomic objects within the confinement apparatus. For example, the controller 30 may cause a controlled evolution of quantum states of one or more atomic objects within the confinement apparatus to execute a quantum circuit and/or algorithm. For example, the controller 30 may read and/or detect quantum states of one or more atomic objects within the confinement apparatus at one or more points during the execution of a quantum circuit. In various embodiments, the atomic objects confined by the confinement apparatus are used as qubits of the quantum computer 110.

Exemplary Atomic Object Confinement Apparatus

FIG. 2 provides a top view of an example confinement apparatus 200 that may be used to confine the at least two atomic objects. For example, in an example embodiment, the confinement apparatus is an ion trap (e.g., a surface ion trap) and the atomic objects are ions. In an example embodiment, the confinement apparatus 200 (e.g., surface ion trap) is fabricated as part of an ion trap chip and/or part of an ion trap apparatus and/or package. In an example embodiment, the confinement apparatus 200 is at least partially defined by a number of RF electrodes 212 (e.g., 212A, 212B). In various embodiments, the confinement apparatus 200 is at least partially defined by a number of sequences of longitudinal electrodes 214 (e.g., 214A, 214B, 214C). Each sequence of longitudinal electrodes 214 comprises a plurality of longitudinal electrodes 216. In an example embodiment, each longitudinal electrode 216 and/or at least a non-empty subset of the longitudinal electrodes 216 may be operated independently via the application of control signals thereto. In an example embodiment, the confinement apparatus 200 is a surface Paul trap with symmetric RF electrodes 212. In various embodiments, the RF electrodes 212 and the longitudinal electrodes 216 generate potentials and/or fields that are experienced by atomic objects within a confinement region 201 of the confinement apparatus 200. In particular, the RF electrodes 212 may be configured to define the confinement region 201 of the confinement apparatus 200 and the longitudinal electrodes 216 may be configured to at least partially control movement and/or motion of atomic objects within the confinement region 201.

In various embodiments, the upper surface of the confinement apparatus 200 has a planarized topology. For example, the upper surface of each RF electrode 212 of the number of RF electrodes 212 and the upper surface of each longitudinal electrode 216 of the number of sequences of longitudinal electrodes 214 may be substantially coplanar.

In various embodiments, the confinement apparatus 200 comprises and/or is at least partially defined by a number of RF electrodes 212. The RF electrodes 212 are formed with substantially parallel longitudinal axes 211 (e.g., 211A, 211B) and with substantially coplanar upper surfaces. For example, the RF electrodes 212 are substantially parallel such that a distance between the RF electrodes 212 is approximately constant along the length of the RF electrodes 212 (e.g., the length of an RF electrode being along the longitudinal axes 211 of RF electrode 212). For example, the upper surfaces of the RF electrodes 212 may be substantially flush with the upper surface of the confinement apparatus 200. In an example embodiment, the number of RF electrodes 212 comprises two RF electrodes 212 (e.g., 212A, 212B). In various embodiments, the confinement apparatus 200 may comprise a plurality of number of RF electrodes 212. For example, the confinement apparatus 200 may be a two-dimensional ion trap that comprises multiple numbers (e.g., pairs and/or sets) of RF electrodes 212 with each number (e.g., pair and/or set) of RF electrodes 212 having substantially parallel longitudinal axes 211. In an example embodiment, a first number of RF electrodes 212 have mutually substantially parallel longitudinal axes 211, a second number of RF electrodes 212 have mutually substantially parallel longitudinal axes 211, and the longitudinal axes of the first number of RF electrodes and the longitudinal axes of the second number of RF electrodes are substantially non-parallel (e.g., transverse). FIG. 2 illustrates an example one dimensional confinement apparatus 200 and/or a portion of a two-dimensional confinement apparatus 200 having two RF electrodes 212, though other embodiments may comprise additional RF electrodes in various configurations.

In various embodiments, two adjacent RF electrodes 212 may be separated (e.g., insulated) from one another by a longitudinal gap. In various embodiments, the confinement region 201 is at least partially over the longitudinal gap. For example, the longitudinal gap may define (in one or two dimensions) the confinement region 201. In various embodiments, the confinement region 201 may extend substantially parallel to the longitudinal axes 211 of the adjacent RF electrodes 212. For example, the longitudinal gap may extend substantially parallel to the x-axis as shown in FIG. 2. In an example embodiment, the longitudinal gap may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap has a height (e.g., in the y-direction) of approximately 40 μm to 500 μm. In various embodiments, one or more sequences of longitudinal electrodes 214 (e.g., a second sequence of longitudinal electrodes 214B) may be disposed and/or formed within the longitudinal gap.

In an example embodiment, a transverse gap may exist between neighboring and/or adjacent longitudinal electrodes 216 of the one or more sequences of electrodes 214. In an example embodiment, the transverse gap may be empty space and/or at least partially filled with a dielectric material to prevent electrical communication between neighboring and/or adjacent electrodes. In an example embodiment, the transverse gap between neighboring and/or adjacent electrodes may be in the range of approximately 1-10 μm.

In an example embodiment, a longitudinal gap exists between a sequence of longitudinal electrodes 214 and a neighboring and/or adjacent RF electrode 212. In an example embodiment, the longitudinal gap may be at least partially filled with a dielectric and/or insulating material to prevent electrical communication between longitudinal electrodes 216 of the sequence of electrodes 214 and the RF electrode 212. In an example embodiment, the longitudinal gap between neighboring and/or adjacent electrodes may be in the range of approximately 1-10 μm.

In various embodiments, the confinement apparatus 200 may be at least partially defined by a number of sequences of longitudinal electrodes 214 (e.g., first sequence of longitudinal electrodes 214A, second sequence of longitudinal electrodes 214B, third sequence of longitudinal electrodes 214C). Each sequence of longitudinal electrodes 214 is formed to extend substantially parallel to the substantially parallel longitudinal axes 211 of the RF electrodes 212. For example, the number of sequences of longitudinal electrodes 214 may extend substantially parallel to the x-axis as shown in FIG. 2. In various embodiments, the number of sequences of longitudinal electrodes 214 comprises two, three, four, and/or another number of sequences of longitudinal electrodes 214. In an example embodiment, the confinement apparatus 200 comprises a plurality of number of sequences of longitudinal electrodes 214. For example, the illustrated confinement apparatus 200 is a one-dimensional ion trap comprising three sequences of longitudinal electrodes 214. For example, the confinement apparatus 200 may be a two-dimensional ion trap that comprises multiple numbers of sequences of longitudinal electrodes 214 that each extend substantially parallel to a substantially parallel longitudinal axes of a corresponding number of RF electrodes 212. In an example embodiment, a first number of sequences of longitudinal electrodes 214 extend substantially parallel to the substantially parallel longitudinal axes 211 of a first number of RF electrodes 212, a second number of sequences of longitudinal electrodes 214 extend substantially parallel to the substantially parallel longitudinal axes 211 of a second number of RF electrodes 212, and the longitudinal axes of the first number of RF electrodes and the longitudinal axes of the second number of RF electrodes are substantially non-parallel (e.g., transverse). In some embodiments, each of the longitudinal electrodes 216 of the number of sequences of longitudinal electrodes 214 can be formed with substantially coplanar upper surfaces that are substantially coplanar with the upper surfaces of the RF electrodes 212.

In an example embodiment (e.g., as illustrated in FIG. 2), a number (e.g., pair) of RF electrodes 212 may be formed between a first sequence of longitudinal electrodes 214A and a third sequence of longitudinal electrodes 214C with a second sequence of longitudinal electrodes 214B extending along the longitudinal gap between the RF electrodes 212. For example, each sequence of longitudinal electrodes 214 may extend in a direction substantially parallel to the longitudinal axes 211 of the RF electrodes 212 (e.g., in the x-direction). In various embodiments, the upper surfaces of the sequences of longitudinal electrodes 214 are substantially coplanar with the upper surfaces of the RF electrodes 212.

In various embodiments, RF signals may be applied to the RF electrodes 212 to generate an electric and/or magnetic field that acts to maintain an atomic object (e.g., ion) trapped within the confinement apparatus 200 in directions transverse to the longitudinal direction of the confinement apparatus 200 (e.g., the y- and z-directions). In various embodiments, control signals and/or voltages are applied to the longitudinal electrodes 216 to generate a desired electric potential field within the confinement region 201. For example, in various embodiments, time-dependent, time-varying, time evolving, and/or non-static direct current (DC) voltages may be applied to the longitudinal electrodes 216 to generate a time-dependent, time-varying, time evolving, and/or non-static electric potential field that causes the atomic objects trapped within the confinement apparatus 200 to traverse corresponding trajectories to within the confinement region 201. For example, the atomic objects may be moved between various zones of the confinement apparatus 200 such that various functions may be performed thereon. For example, the atomic objects may be initialized, gated via single qubit gates, gated via double/multiple qubit gates, transported and/or stored, read and/or detected, and/or the like. In an example embodiment, the longitudinal electrodes 216 are configured to, responsive to control signals applied thereto, generate push fields and/or oscillating potentials configured to cause an atomic object experiencing the push field and/or oscillating potential to experience oscillations and/or small back and forth movements. In various embodiments, a push field 130 is configured to push an atomic object off of the RF null axis 210 (which is co-located with the longitudinal axis 205 of the confinement region 201 in an example embodiment) of the confinement apparatus 200. An atomic object pushed off of the RF null axis 210 will experience a potential (e.g., at least partially generated by application of the RF signal to the RF electrodes 212) that causes the atomic object to oscillate and/or experience small back and forth motions in a direction transverse (e.g., perpendicular, in an example embodiment) to the RF null axis 210 at the location of the atomic object along the RF null axis 210/longitudinal axis 205 of the confinement apparatus 200. For example, pushing an atomic object radially away from the RF null axis 210 (e.g., in a y-z plane) will experience a potential that causes the atomic object to oscillate and/or experience small back and forth motions in a radial direction of the confinement region (e.g., in the y direction when the atomic object is pushed off the RF null axis 210 in the y direction, as shown in FIGS. 2 and 7). In various embodiments, an oscillating potential 145 is configured to cause the atomic object experiencing the oscillating potential 145 to oscillate and/or experience small back and forth motions in a direction substantially parallel to RF null axis 210/longitudinal axis 205 of the confinement apparatus 200. For example, experiencing an oscillating potential will cause an atomic object to oscillate and/or experience small back and forth motions in a longitudinal direction of the confinement region 201.

In various embodiments, the control signals and/or voltages applied to the longitudinal electrodes 216 are controlled by one or more connected devices (e.g., a controller 30 as shown in FIG. 6 and/or the like) via leads. For example, depending on the electric monopole and/or dipole (or higher magnitude pole) strength (e.g., electric charge in the case of an electric monopole) of the atomic object, longitudinal voltages may be raised or lowered for longitudinal electrodes 216 in the vicinity of a particular atomic object to cause the particular atomic object to traverse a desired trajectory. For example, a controller 30 may control a voltage driver to cause the voltage driver to apply control signals and/or longitudinal voltages to the longitudinal electrodes to generate a time-dependent electric potential (e.g., an electric potential that evolves, changes, and/or varies with time) that causes the atomic objects within the confinement apparatus 200 to traverse desired trajectories. In various embodiments, the controller 30 may control a voltage driver (or other signal generator) to cause the voltage driver (or other signal generator) to generate an electric potential that causes one or more neighboring atomic objects to oscillate or experience small back and forth motions such that crosstalk is reduced during a read and/or detection function.

Depending on such factors as the electric monopole and/or dipole (or higher magnitude pole) strength (e.g., electric charge in the case of an electric monopole) of the atomic objects and/or the shape and/or magnitude of the combined electrical and/or magnetic fields, the atomic objects can be stabilized at a particular distance (e.g., approximately 20 μm to approximately 200 μm) above an upper surface of the confinement apparatus 200 (e.g., the coplanar upper surface of the sequences of longitudinal electrodes 214 and RF electrodes 212). To further contribute to controlling the transit of atomic objects along desired trajectories, the confinement apparatus 200 may be operated within a cryogenic and/or vacuum chamber capable of cooling the confinement apparatus 200 to a temperature of less than 124 Kelvin (e.g., less than 100 Kelvin, less than 50 Kelvin, less than 10 Kelvin, less than 5 Kelvin, and/or the like), in various embodiments.

In various embodiments, the RF electrodes 212, the sequences of electrodes 214, and/or the confinement potential generated by the RF electrodes and/or the sequences of electrodes 214 define a confinement region 201 of the confinement apparatus 200. In an example embodiment, the RF electrodes 212 and/or the confinement potential generated by the RF electrodes define a confinement region 201 of the confinement apparatus 200 and the longitudinal electrodes 216 control the movement and/or positioning of the atomic objects within the confinement region 201. In various embodiments, the RF electrodes 212, the sequences of electrodes 214, and/or the confinement potential generated by the RF electrodes and/or the sequences of electrodes 214 define an axis 205 of the confinement apparatus 200. For example, the RF electrodes 212 and/or the confinement potential generated by the RF electrodes may define an axis 205 of the confinement apparatus 200. In various embodiments, the confinement potential generally acts to align the atomic objects within the confinement apparatus 200 along the RF null axis 210 and/or the longitudinal axis 205 of the confinement apparatus 200.

Example Cooling Operations

Various embodiments provide quantum computers, systems, apparatuses, and/or the like and corresponding methods for performing laser cooling a second component of an atomic object. In various embodiments, the coupling of two or more motional modes to decrease laser cooling time of the atomic object may be performed using various types of laser cooling (e.g., Doppler cooling, resolved sideband cooling, EIT cooling, and/or the like). An exemplary embodiment of using the coupling of two or more motional modes to decrease cooling time will now be discussed with an example EIT cooling based on a two photon resonant transition between one or more states of an S manifold of a second component of an atomic object to one or more states of a D manifold of the second component of the atomic object by way of the P manifold of the second component of the atomic object is illustrated in FIG. 3. However, in various embodiments, Doppler cooling, resolved sideband cooling, and/or EIT cooling may be used to cool the atomic object.

In various embodiments, an EIT cooling operation is performed using a first manipulation signal that couples one or more states of the S manifold to one or more states of the P manifold and a second manipulation signal that couples the one or more states of the P manifold to one or more states of the D manifold. In various embodiments, both the first manipulation signal and the second manipulation signal are detuned above the one or more states of the P manifold to establish a dark state associated with a two-photon transition between the S manifold and the D manifold. By coupling the S manifold to the P manifold and the P manifold to the D manifold, efficient cooling can be accomplished to near motional ground state of the atomic object (e.g., to temperatures significantly below the Doppler cooling limit) with lower laser power requirements than resolved sideband cooling and in a less technically complex manner than conventional EIT cooling. Moreover, in various embodiments, the first and second manipulation sources used to generate and/or provide the first and second manipulation signals may be used to also perform Doppler cooling. Thus, various embodiments enable the use of both Doppler cooling and EIT cooling.

FIG. 3 provides a partial level diagram of an example second component of an atomic object (e.g., a cooling ion) illustrating an example EIT cooling operation, in accordance with various embodiments. The partial level diagram illustrates an S manifold 310. In various embodiments, the EIT cooling operation makes use of one or more states of the S manifold 310 (e.g., one or two states of the S manifold). The partial level diagram also illustrates a P manifold 320. In various embodiments, the EIT cooling operation makes use of one or more states of the P manifold 320 (e.g., one or two states of the P manifold). The partial level diagram further illustrates a low-lying D manifold 330. In various embodiments, the EIT cooling operation makes use of one or more states of the D manifold 330 (e.g., one, two, three, or four states of the D manifold).

Performance of an EIT cooling operation of various embodiments comprises application of a first manipulation signal 315 and a second manipulation signal 325 to an atomic object. In an example embodiment, the first manipulation signal 315 is characterized by a first wavelength $\lambda_1$ and is π-polarized, as illustrated in FIG. 3. The first wavelength $\lambda_1$ corresponds to the transition between the S manifold 310 and the P manifold 320. In various embodiments, the first wavelength $\lambda_1$ corresponds to the resonant frequency of the transition between the S manifold 310 and the P manifold 320 and is detuned therefrom by a first detuning $\Delta_{SP}$.

In an example embodiment, the second manipulation signal 325 is characterized by a second wavelength $\lambda_2$ and is σ-polarized. For example, the second manipulation signal 325 is linearly polarized in a direction perpendicular to the magnetic field ($\sigma^{+/-}$-polarized). The second wavelength $\lambda_2$ corresponds to the transition between the P manifold 320 and the D manifold 330. In various embodiments, the second wavelength $\lambda_2$ corresponds to the resonant frequency of the transition between the P manifold 320 and the D manifold 330 and is detuned therefrom by a second detuning $\Delta_{PD}$.

In various embodiments, the first and second detunings are substantially equivalent to one another (e.g., $\Delta_{SP} \approx \Delta_{PD}$), when measured with respect to a particular set of three levels, one each from the S-, D-, and P-manifolds. In an example embodiment, the second component of an atomic object is singly ionized Ba, the first wavelength $\lambda_1 \approx 493$ nm, the second wavelength $\lambda_2 \approx 650$ nm, and the first and second detunings $\Delta_{SP} \approx 20$ MHz$\approx \Delta_{PD}$. In various embodiments, the frequency of the first manipulation signal 315 and the frequency of the second manipulation signal 325 are stabilized with respect to one another within a tolerance $\Delta\omega/(2\pi)$ ≤100 kHz. As should be understood, various other polarization schemes, wavelengths, and detunings are used in various other embodiments based on the energy structure of the second component of the atomic object and the selected dark state.

As used herein the term dark state refers to a coherent superposition of two states formed by the appropriate two-photon transition. For the embodiments illustrated in FIG. 3, the respective dark state is formed by a superposition of a state in the S manifold and a state in the D manifold that are coupled via the first manipulation signal 315 and the second manipulation signal 325.

As should be understood, as used herein, a transition between a first manifold and second manifold (e.g., the S manifold and the P manifold, the P manifold and the D manifold) indicates a transition between a state of the first manifold and a state of the second manifold. As used herein, a manifold of states refers to a group of states with the same total angular momentum, with each manifold comprising multiple states differing in energy by Zeeman splitting due to an applied magnetic field. The total angular moment of a state corresponds to the sum of the spin angular moment and the orbital angular momentum of the state (which includes nuclear angular momentum via the hyperfine coupling when the nuclear angular momentum is non-zero).

In FIG. 3, an example two-photon resonance consisting of the $m_j=\frac{1}{2}$ state of the $S_{1/2}$ manifold 310 and the $m_j=\frac{3}{2}$ state of the $D_{3/2}$ manifold 330, which can be used in an S EIT cooling operation of an example embodiment, is shown via the coupling by the first manipulation signal 315 shown as a solid line and the second manipulation signal 325 shown as a solid line.

The frequency width of the two-photon resonance depends on the single photon detuning from the states of the $P_{1/2}$ manifold (e.g., $\Delta_{SP}$, $\Delta_{PD}$). For example, when the first and/or second detunings are decreased, the width of the two-photon resonance becomes broader, and when the first and/or second detunings are increased, the width of the two-photon resonance becomes narrower. A narrower frequency width of the two-photon resonance provides faster cooling to lower temperatures (compared to a broad frequency width of the two-photon resonance), while a broader frequency width of the two-photon resonance provides a broader cooling bandwidth (compared to a narrow frequency width of the two-photon resonance).

In various embodiments, the first detuning $\Delta_{SP}$ and the second detuning $\Delta_{PD}$ are set to a detuning in the range of 10-450 MHz. For example, in an example embodiment, $\Delta_{SP}=\Delta_{PD}\approx20$ MHz, which provides a cooling bandwidth sufficiently large to efficiently cool many motional modes of an atomic object (e.g., an ion crystal such as an ion crystal comprising four ions), while still maintaining cooling speeds and final temperatures that are sufficient for various applications, including cooling of atomic objects confined by an atomic object confinement apparatus of a quantum computer where the atomic objects comprise qubit ions for use as the qubits of the quantum computer.

In some embodiments, EIT cooling of ions having a Ba⁺-like energy structure may include coupling a first (Zeeman) state in a ground manifold (e.g., S manifold corresponding to angular momentum quantum number l=0) to an excited state in an excited manifold and the excited state in the excited manifold to a second (Zeeman) state in the ground manifold (e.g., S manifold) using a single laser for both couplings. In other words, the EIT cooling may couple two states within the same manifold using a two-photon transition.

Moreover, in various embodiments, the first and second manipulation sources used to generate and/or provide the first and second manipulation signals may be used to also perform Doppler cooling. Thus, various embodiments enable the use of both Doppler cooling and EIT cooling without requiring additional lasers or other manipulation sources.

FIG. 3 illustrates an example partial level diagram of an example second component of an atomic object (e.g., a cooling ion) illustrating an example cooling operation. As should be understood, a first component of the atomic object may have a different level diagram and may be cooled based on a corresponding level diagram. For example, in an example embodiment, the first component of the atomic object may a level diagram with a Yb⁺-like energy structure (e.g., similar fine and/or hyperfine energy structure to a singly ionized Yb atom). In various embodiments, the second component of the atomic object may be cooled via EIT cooling and a first component of the atomic object is cooled via sympathetic cooling via interaction with the second component of the atomic object. In an example embodiment, the first component is used as a qubit of a quantum computer. In various embodiments, the first component of the atomic object may be cooled via EIT cooling and a second component of the atomic object is cooled via sympathetic cooling via interaction with the first component of the atomic object. In an example embodiment, the second component is used as a qubit of a quantum computer.

In some embodiments, an EIT cooling operation is a clock state EIT cooling operation. For example, the clock state EIT cooling operation is configured for use with atomic objects where the first component is singly ionized ytterbium (e.g., 171Yb) atoms or another atomic object component having a similar energy structure (e.g., similar fine structure and/or hyperfine structure). For example, the clock state EIT cooling operation may be performed with atomic objects where the first component has electron spin ½ and nuclear spin ½. For example, the energy structure of the first component of the atomic object comprises a low-energy manifold containing two states that form a pair of "clock" states, the defining feature of which is that the energy difference between the two states is insensitive to magnetic field fluctuations. For example, the $S_{1/2}$, F=0, M=0 and $S_{1/2}$, F=1, M=0 states in singly ionized 171Yb are an example of such a pair of clock states. The pair of clock states permits transitions to a common higher-energy manifold, such as the P manifold in 171Yb, with a linewidth that is large enough to allow convenient laser coupling.

Various embodiments provide corresponding methods for performing EIT laser cooling of an atomic object and should not be construed as limited to the embodiments set forth herein. As should be understood, other types of laser cooling, such as Doppler cooling and resolved sideband cooling, may also be used to cool the atomic objects.

Example Geometry for Performing a Cooling Operation through the Use of Phonon Pumping FIG. 4 illustrates an example geometry for performing a cooling operation through the use of phonon pumping, according to some embodiments of the present disclosure. FIG. 4 shows an atomic object 408 located and/or disposed in particular region 201 of the atomic object confinement apparatus 200. The atomic object 408 comprises a first component 410 and a second component 412. The first component 410 is of a first atomic type and the second component 412 is of a second atomic type, and the first atomic type and the second atomic type are different. In an example embodiment, the first component 410 is a singly ionized Yb atom and the second component 412 is a singly ionized Ba atom. The first and second components 410, 412 are aligned along and/or disposed so as to define an atomic object axis 405. In an example embodiment, the atomic object axis 405 is substantially parallel to a radio frequency null 450 of the particular region 201 of the atomic object confinement apparatus 200. The radio frequency null 450 is the zero-point line of a pseudopotential generated by applying a radio frequency voltage signal to radio frequency electrodes and/or rails of the atomic object confinement apparatus 200.

In various embodiments, a magnetic field B is generated such that in the particular region 201 the magnetic field B has a finite and substantially stable (e.g., not changing with time) amplitude (e.g., 2-10 Gauss and/or 5 Gauss in an example embodiment). In various embodiments, the magnetic field B in the particular region 201 has a magnetic field direction that forms an angle α with the atomic object axis 405. In an example embodiment, the angle α is in a range of 30 to 60 degrees. In an example embodiment, the angle α is approximately 45 degrees.

In various embodiments, the first manipulation signal 315 has a polarization 318 (e.g., π-polarization). In an example embodiment, the polarization 318 of the first manipulation signal 315 is substantially parallel to the magnetic field direction. In various embodiments, the first propagation direction is transverse to the atomic object axis 405. In an example embodiment, the first manipulation signal 315 propagates in a first propagation direction that forms an angle β with the atomic object axis 405. In various embodiments, the angle β is configured such that the propagation of the first manipulation signal 315 is not parallel or anti-parallel to the magnetic field direction. In various embodiments, the angle β is in a range of 30 to 60 degrees. In an example embodiment, the angle β is approximately 45 degrees.

In various embodiments, the second manipulation signal 325 has a polarization 328 (e.g., $\sigma^{+/-}$-polarization). In an example embodiment, the polarization 328 of the second manipulation signal 325 is transverse to the magnetic field direction. In various embodiments, the second propagation direction is transverse to the atomic object axis 405. In an example embodiment, the second manipulation signal 325 propagates in a second propagation direction that forms an angle γ with the atomic object axis 405. In various embodiments, the angle γ is in a range of 0 to 90 degrees. In an example embodiment, the angle γ is approximately 45 degrees.

In various embodiments, the first propagation direction is substantially anti-parallel to the second propagation direction. In various embodiments, both the first propagation direction and the second propagation are transverse to the magnetic field direction. In an example embodiment, the first propagation direction and the second propagation direction are substantially perpendicular to the magnetic field direction.

In various embodiments, the difference between the first propagation direction $\widehat{k_1}$ (a unit vector in the direction of the wavevector of a respective first manipulation signal 315) and the second propagation direction $\widehat{k_2}$ (a unit vector in the direction of the wavevector of a respective second manipulation signal 325) has a non-zero projection on the direction of the motion to be cooled. For example, when the mode of the atomic object 408 to be cooled is an axial mode (e.g., corresponds to motion along the atomic object axis 405), $\hat{\iota} \cdot \widehat{\Delta k} \neq 0$, where $\hat{\iota}$ is a unit vector along the atomic object axis 405 and $\widehat{\Delta k} = \widehat{k_1} - \widehat{k_2}$ . In another example, when the mode of the atomic object 308 to be cooled is a radial mode (e.g., corresponds to motion orthogonal to the atomic object axis 405), $\hat{J} \cdot \widehat{\Delta k} \neq 0$, where $\hat{J}$ is a radial unit vector (e.g., $\hat{\iota} \cdot \hat{J} = 0$) and $\widehat{\Delta k} = \widehat{k_1} - \widehat{k_2}$.

In various embodiments, the atomic object may take a form of an ion crystal and is confined by a confinement region 201 of an atomic object confinement apparatus 200. For example, the ion crystal may comprise the first component 410 of the atomic object 408 and the second component 412. In general, the atomic object 408 may be located and/or aligned along the RF null axis 405 such that a crystal axis 420 defined by the atomic object 408 may be substantially aligned with the RF null axis 210.

In some embodiments, the motional modes of the atomic object 408 (e.g., the ion crystal 408 includes 2 ions) may include 2 axial motional modes, where the first component 410 may move in a direction (e.g., x direction) along the crystal axis 420 and the second component 412 may move in the direction along the crystal axis 420. The motional modes of the atomic object 408 may further include 4 radial motional modes, where the first component 410 may move in directions (e.g., y direction and z direction) perpendicular to the crystal axis 420 and the second component 412 may move in the direction (e.g., y direction and z direction) perpendicular to the crystal axis 420.

For example, as shown in FIG. 4, the first component 410 may be displaced along the crystal axis 420 to a position at 410' and a second component 412 may be displaced along the crystal axis 420 to a position at 412', where the displacements indicated by arrows and experienced by the first component 410 and the second component 412 are corresponding to the first axial mode. Alternatively, the first component 410 and the second component 412 may move toward each other along the crystal axis 420 and undergo a corresponding second axial mode.

For example, the first component 410 may be displaced along the y direction to a position at 410" and the second component 412 may be displaced along the y direction to a position at 412", where the displacements indicated by arrows and experienced by the first component 410 and the second component 412 are corresponding to a first radial mode. Alternatively, the first component 410 and the second component 412 may move in opposite directions and undergo a corresponding second radial mode. Similarly, the first component 410 and the second component 412 may also move in the z direction and undergo two additional radial modes.

When cooling the atomic object, each of the motional modes of the atomic object needs to be cooled independently and the cooling rates of different motional modes may be very different from each other. For example, the axial motional modes may cool much faster than the radial motional modes. But all the motional modes need to be cooled to the motional ground state of the atomic objects before we start any gate operations on the atomic objects. The total cooling time is mostly limited by the slowest cooling rate of all the motional modes. In various embodiments, the energy (phonons) may be transferred from motional modes with slower cooling rates to motional modes with faster cooling rate, such that the motional modes with the slower cooling rates may be cooled at the faster cooling rate.

For example, axial motional modes of the atomic object may be cooled much faster than radial motional modes of the atomic object. For example, the energy (phonons) may be transferred from a radial motional mode to an axial motional mode by using a parametric coupling method. The parametric coupling method is colloquially known as phonon pumping in QTM. To couple the radial motional mode with the axial motional mode, an oscillating electric potential is created by using the one or more radio frequency (RF)

electrodes of the confinement apparatus 200. For example, the oscillating electric potential may take a form of $$\frac{\partial^2 V}{\partial x \partial y} xy \cos(\delta\omega t)$$

at the position of the atomic object, where $\delta\omega$ is a frequency difference between the radial motional mode and the axial motional mode, and x and y are the primary directions of the axial motional mode and the radial motional mode.

When two target motional modes, such as a radial motional mode and an axial motional mode, have been coupled to each other, the two target modes may be cooled at a cooling rate that equals an average of a cooling rate of each of the two target modes.

The geometry illustrated in FIG. 4 corresponds to the EIT cooling arrangement illustrated by FIG. 3. As should be understood, the direction of propagation, polarization, wavelengths/frequencies, and/or number of the manipulation signals 315, 325 and the magnetic field direction may vary based on the type of laser cooling being performed.

In some embodiments, the first component 410 are singly ionized Yb atom and the second component 412 is singly ionized Ba atom. The oscillating electric potential may be created to couple an axial stretch mode of the Ba ion with two radial stretch modes of the Yb ion. The Ba doppler cooling may be on during the coupling process. For example, a 50 times reduction of cooling time may be achieved when we cool the atomic object with cooling light is tuned to cool the Ba ion while coupling the axial stretch mode of the Ba ion with the two radial stretch modes of the Yb ion.

In some embodiments, the first component 410 may include two ionized Yb atoms and the second component 412 may include two ionized Ba atoms. In some embodiments, the first component 410 may include more than two ionized Yb atoms and the second component 412 may include more than two ionized Ba atoms.

In some embodiments, at least one radial mode of the one or more radial modes of the atomic object are dominated by the first species of the atomic object and at least one axial mode of the one or more axial modes of the atomic object are dominated by the second species of the atomic object.

In some embodiments, the first component of the atomic object and the second component of the atomic object are ions of a same atomic type, where the second component of the atomic object may be a sympathetic cooling ion and use a cycling transition to cool motional modes of the atomic object.

Example Method of Performing a Cooling Operation through the Use of Phonon Pumping FIG. 5 provides a flowchart illustrating various processes, procedures, and/or the like for performing a cooling operation through the use of phonon pumping, in accordance with various embodiments. The example embodiment shown in FIG. 5 corresponds to the performance of a cooling operation on an atomic object 408 by a QCCD-based quantum computer, such as quantum computer 110. In various embodiments, the processes, procedures, and/or the like illustrated in FIG. 5 are performed by a controller 30 of the quantum computer 110.

Starting at step/operation 502, the controller 30 may control one or more voltage sources to cause a confinement apparatus 200 to confine the atomic object 408 at a position 201 defined by the confinement apparatus 200. The confinement apparatus 200 may include (a) one or more radio frequency (RF) electrodes defining an RF null axis 405 of the atomic object confinement apparatus 200 and (b) a plurality of control electrodes, where the atomic object 408 may include at least two quantum objects, the at least two quantum objects including a first component 410 of a first species of the at least two quantum objects and a second component 412 of a second species of the at least two quantum objects. Motions of the atomic object at the position defined by the confinement apparatus 200 may include contributions from one or more radial motional modes of the atomic object 408 and contributions from one or more axial motional modes of the atomic object 408.

In various embodiments, the atomic object 408 may be located and/or aligned along the RF null axis 405 such that a crystal axis 420 defined by the atomic object 408 may be substantially aligned with the RF null axis 210.

At step/operation 504, the controller 30 may cause at least one first control signal to be provided to at least one control electrode of the plurality of control electrodes. The at least one first control signal may cause the at least one control electrode to generate an oscillating electric potential at the position 201 defined by the confinement apparatus 200 and be configured to cause two or more motional modes to couple to one another. For example, the oscillating electric potential at the position 201 is configured to cause at least one radial mode of the one or more radial modes of the atomic object to couple to at least one axial mode of the one or more axial modes of the atomic object or cause two radial modes of the atomic object to couple to each other such that motional energy is transferred from the at least one radial motional mode to the at least one axial motional mode or between the two radial modes. In an example embodiment where two radial modes of the atomic object are coupled to each other, the two radial modes are perpendicular and/or transverse to each other. The oscillating electric potential has a frequency that equals a frequency difference between two modes that are being coupled to one another (e.g., the frequency difference between the at least one radial motional mode and the at least one axial motional mode or the frequency difference between a first radial mode and a second radial mode that are being coupled to one another).

In various embodiments, the oscillating electric potential may be applied to couple the motional modes with slower cooling rates to the motional modes with faster cooling rates. For example, the oscillating electric potential may have a frequency equals a frequency difference between the motional states with slower cooling rates and the motional states with faster cooling rates. The energy (phonons) may be transferred from the motional states with slower cooling rates to the motional states with faster cooling rates. For example, the motional modes with faster cooling rates may be axial motional modes of the atomic object, and the motional modes with slower cooling rates may be radial motional modes of the atomic object.

In various embodiments, the oscillating electric potential may take the form of a pulse and couple the motional states with slower cooling rates to the motional states with faster cooling rates for one $\pi$ time. The phonon occupation of the motional states with slower cooling rates may be transferred to the motional states with faster cooling rates, such that the motional states with faster cooling rates have low excitation. Cooling light may be applied to the motional states with faster cooling rates to cool the motional states with faster cooling rates to cool the atomic objects to its target temperature.

In various embodiments, the oscillating potential may be a continuous oscillating potential. The oscillating potential may be configured to cause the at least one radial mode of the one or more radial modes of the atomic object and the at least one axial mode of the one or more axial modes of the atomic object to hybridize.

In various embodiments, the at least one radial mode of the one or more radial modes of the atomic object and the at least one axial mode of the one or more axial modes of the atomic object are cooled at a same rate in response to the cooling signals being tuned to cause cooling of the second component of the second species of the at least two quantum objects.

At step/operation 506, the controller 30 may control one or more manipulation sources 64 to cause cooling signals 66 to be incident on the atomic object 408, where the at least one radial motional mode is dominated by motion of the first component 410 of the first species of the at least two quantum objects and the cooling signals are tuned to cause cooling of the second component 412 of the second species of the at least two quantum objects.

In various embodiments, the first component of the first species of the at least two quantum objects is configured for use as a coolant ion in a sympathetic cooling scheme for the atomic object.

In various embodiments, the first species quantum object may be a Yb ion, and the second species quantum object may be an Ba ion.

At step/operation 508, the controller 30 may determine whether a threshold temperature is achieved for the atomic object. For example, the controller 30 may control one or more elements of the quantum computer 110 to perform one or more measurements to determine a temperature and/or motional mode of the atomic object 408 disposed in the particular region 201. If it is determined that the threshold temperature is achieved for the atomic object 408, the method may proceed to step 510. If it is determined that the threshold temperature is not achieved for the atomic object 408, the method may proceed to step 504.

In various embodiments, a sequence of applying the oscillating potential and the cooling light may be repeated several times to cool the atomic objects to its target temperature.

At step/operation 510, the controller 30 may cease providing the at least one first control signal to at least one control electrode of the plurality of control electrodes and cease providing the cooling signals 66 to be incident on the atomic object 408. For example, the controller 30 may cause the at least one first control signal to stop generating the oscillating potential at the particular region 201 confined by the confinement apparatus. For example, the controller 30 may cause the one or more manipulation sources 64 to stop generating the cooling signal 315/325. For example, the controller 30 may control one or more modulators to cause the cooling signal 315/325 to stop being provided and/or applied to the particular region 201.

At step/operation 512, the controller 30 controls various elements of the quantum computer 110 (e.g., voltage sources, manipulation sources 64, magnetic field generators 70, and/or the like) to execute the next operation of the quantum circuit. For example, the controller 30 causes the next operation of the quantum circuit to be performed and/or executed. For example, the controller 30 may control various elements of the quantum computer 110 to cause one or more atomic objects to be transported into, out of, and/or within the particular region 201, perform one or more quantum gates on one or more atomic objects, read a state of one or more atomic objects and/or components of atomic objects, and/or the like.

In various embodiments, a controller 30 may control one or more drivers to cause a plurality of potential generating elements (e.g., RF electrodes 212 and control electrodes 216) of a confinement apparatus to generate a time-dependent potential field (e.g., a potential field that evolves with time) that causes the atomic object 408 to be confined by the confinement region 201 of the confinement apparatus 200. An example quantum computer 110 and controller 30 are described in more detail elsewhere herein with respect to FIG. 1 and FIG. 6. The controller 30 may control the one or more drivers (e.g., voltage sources 50), manipulation sources 60 (e.g., lasers), and/or the like to cause a next operation of the quantum circuit to be performed using the atomic object 408 within the confinement apparatus 200.

A quantum circuit is a computational routine comprising coherent quantum operations on quantum data, such as qubits (e.g., the first component of the atomic object 408). For example, a quantum circuit includes an ordered sequence of quantum gates. Execution and/or performance of a quantum circuit by a quantum computer causes the quantum computer to perform a corresponding algorithm. For example, to perform an algorithm and/or computation, a quantum computer may perform and/or execute a quantum circuit which includes first initializing one or more qubits (e.g., the first component of the atomic object 408) into an initial quantum state, then performing an ordered series of quantum gates and/or other operations on the one or more qubits, and finally reading and/or detecting the quantum state of at least one of the qubits to determine an outcome and/or result of performing the algorithm and/or computation.

At least some of the operations performed during execution of the quantum circuit requires the atomic objects be at or near their motional ground state. For example, high fidelity performance of a two-qubit gate using oscillating fields (e.g., laser beams) requires the atomic objects be at or near their motional ground state. Due to heating of the atomic object due to transportation operations, stray fields, and/or the like, it may be necessary to cool the atomic objects at one or more points during the operation of the quantum circuit. In various scenarios, the cooling time (e.g., the time required to cool an atomic object sufficiently close to its motional ground state for an operation to be performed thereon) is longer than the amount of time required for the operation to be performed. In various embodiments, the cooling time is decreased by using phonon coupling to couple one or more slower cooling rate radial modes to a faster cooling rate axial mode so as to decrease the cooling time. This provides for faster quantum circuit run times and enables deeper quantum circuits to be performed (e.g., within the qubit coherence time constraints).

Technical Advantages

Various embodiments provide technical solutions to technical problems of laser cooling atomic objects within a confinement apparatus. For example, when cooling the atomic objects, each motional mode needs to be cooled independently and the cooling rates of different motional modes may be very different. The motions of an atomic object may be divided into several motional modes orthogonal to each other. For example, the motions of an atomic object of a trapped ion crystal with N ions may be described by 3*N uncoupled modes, whose dynamics may usually be treated independently. Since the confined area of the ion trap is linear, the ion crystal may be linear crystal. Thus, the motional modes of an example atomic object crystal may be divided into N axial modes primarily along a direction of a crystal axis (which is generally aligned with a confinement axis defined by the confinement region) and 2*N radial modes perpendicular to the direction of the crystal axis (and/or the confinement axis). For an example atomic object crystal, the axial motional modes may cool much faster than the radial motional modes. But all the motional modes need to be cooled to the motional ground state of the atomic objects before we start any gate operations on the atomic objects. The total cooling time is mostly limited by the slowest cooling rate of all the motional modes. In various embodiments, an oscillating potential may be applied to couple the motional modes with slower cooling rates to the motional modes with faster cooling rates. For example, the oscillating potential may have a frequency equals a frequency difference between the motional states with slower cooling rates and the motional states with faster cooling rates. The energy (phonons) may be transferred from the motional states with slower cooling rates to the motional states with faster cooling rates. For example, the energy (phonons) may be transferred from one or more radial motional modes with slower cooling rates to one or more axial motional modes with faster cooling rates, such that the atomic object may be cooled at a cooling rate closer to that of the axial motional modes. As such, the effective cooling rate of the radial motional modes may be improved and the atomic object may be cooled relatively efficiently.

Thus, various embodiments provide technical improvements to the fields of quantum computer operation (e.g., for a QCCD-based quantum computer and/or the like) and/or laser cooling of confined atomic objects. For example, by reducing the effective cooling time of an atomic object through the coupling of a slower cooling rate radial mode to a faster cooling rate axial mode, provides for faster quantum circuit run times and enables deeper quantum circuits to be performed (e.g., within the qubit coherence time constraints).

Exemplary Controller

In various embodiments, a confinement apparatus 200 is incorporated into a quantum computer 110. In various embodiments, a quantum computer 110 further comprises a controller 30 configured to control various elements of the quantum computer 110. For example, the controller 30 may be configured to control the voltage sources 50, a cryogenic system and/or vacuum system controlling the temperature and pressure within the cryogenic and/or vacuum chamber 40, manipulation sources 64 (e.g., 64A, 64B, 64C), magnetic field generators 70, and/or other systems controlling the environmental conditions (e.g., temperature, humidity, pressure, and/or the like) within the cryogenic and/or vacuum chamber 40, configured to manipulate and/or cause a controlled evolution of quantum states of one or more atomic objects within the confinement apparatus, and/or read and/or detect a quantum state of one or more atomic objects within the confinement apparatus.

As shown in FIG. 6, in various embodiments, the controller 30 may comprise various controller elements including processing elements 605, memory 610, driver controller elements 615, a communication interface 620, analog-digital converter elements 625, and/or the like. For example, the processing elements 605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 605 of the controller 30 comprises a clock and/or is in communication with a clock.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 610 (e.g., by a processing element 605) causes the controller 30 to perform one or more steps, operations, processes, procedures and/or the like described herein for controlling one or more components of the quantum computer 110 (e.g., voltages sources 50, manipulation sources 64, magnetic field generators 70, and/or the like) to cause a controlled evolution of quantum states of one or more atomic objects, detect and/or read the quantum state of one or more atomic objects, and/or the like.

In various embodiments, the driver controller elements 615 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 605). In various embodiments, the driver controller elements 615 may enable the controller 30 to operate a manipulation source 64. In various embodiments, the drivers may be laser drivers; vacuum component drivers; drivers for controlling the flow of current and/or voltage applied to longitudinal, RF, and/or other electrodes used for maintaining and/or controlling the confinement potential of the confinement apparatus (and/or other driver for providing driver action sequences and/or control signals to potential generating elements of the confinement apparatus); cryogenic and/or vacuum system component drivers; and/or the like. For example, the drivers may control and/or comprise longitudinal and/or RF voltage drivers and/or voltage sources that provide voltages and/or electrical signals to the longitudinal electrodes 416 and/or RF electrodes 412. In various embodiments, the controller 30 comprises means for communicating and/or receiving signals from one or more detectors 125 such as optical receiver components (e.g., cameras, MEMs cameras, CCD cameras, photodiodes, photomultiplier tubes, and/or the like). For example, the controller 30 may comprise one or more analog-digital converter elements 625 configured to receive signals from one or more detectors 125, optical receiver components, calibration sensors, and/or the like.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 10 and providing output received from the quantum computer 110 (e.g., from an optical collection system comprising one or more detectors 125) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 7 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110.

As shown in FIG. 7, a computing entity 10 can include an antenna 712, a transmitter 704 (e.g., radio), a receiver 706 (e.g., radio), and a processing element 708 that provides signals to and receives signals from the transmitter 704 and receiver 706, respectively. The signals provided to and received from the transmitter 704 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission

26

Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system. In an example embodiment, the computing entity 10 includes a network interface 720 configured to communicate via one or more wired and/or wireless networks 20.

The computing entity 10 may also comprise a user interface device comprising one or more user input/output interfaces (e.g., a display 716 and/or speaker/speaker driver coupled to a processing element 708 and a touch screen, keyboard, mouse, and/or microphone coupled to a processing element 708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for cooling an atomic object, comprising:

controlling one or more voltage sources to cause a confinement apparatus to confine the atomic object at a position defined by the confinement apparatus, the confinement apparatus comprises (a) one or more radio frequency (RF) electrodes defining an RF null axis of the confinement apparatus and (b) a plurality of control electrodes, wherein the atomic object comprises at least two quantum objects, the at least two quantum objects comprising a first component of a first species of the at least two quantum objects and a second component of a second species of the at least two quantum objects, wherein motion of the atomic object at the position defined by the confinement apparatus comprises contributions from one or more radial motional modes of the atomic object and contributions from one or more axial motional modes of the atomic object;

causing at least one first control signal to be provided to at least one control electrode of the plurality of control electrodes, wherein the at least one first control signal causes the at least one control electrode to generate an oscillating potential at the position defined by the confinement apparatus and configured to cause at least one radial motional mode of the one or more radial motional modes of the atomic object to couple to at least one axial motional mode of the one or more axial motional modes of the atomic object or cause two radial motional modes of the atomic object to couple to each other such that motional energy is transferred from the at least one radial motional mode to the at least one axial motional mode or between the two radial motional modes, the two radial motional modes are perpendicular to each other, and the oscillating potential has a frequency that equals a frequency difference between the at least one radial motional mode and the at least one axial motional mode or a frequency difference between the two radial motional modes; and controlling one or more manipulation sources to cause cooling signals to be incident on the atomic object, wherein the at least one radial motional mode is dominated by motion of the first component of the first species of the at least two quantum objects and the cooling signals are tuned to cause cooling of the second component of the second species of the at least two quantum objects.

2. The method of claim 1, wherein the at least one radial motional mode of the one or more radial motional modes of the atomic object are dominated by the first species of the atomic object and the at least one axial motional mode of the one or more axial motional modes of the atomic object are dominated by the second species of the atomic object.

3. The method of claim 1, wherein the first species of the at least two quantum objects is configured for use as a coolant ion in a sympathetic cooling scheme for the atomic object.

4. The method of claim 1, wherein the first species quantum object is a Yb ion, and the second species quantum object is an Ba ion.

5. The method of claim 1, wherein the oscillating potential is a pulse oscillating potential, which is configured to cause the at least one radial motional mode of the one or more radial motional modes of the atomic object to couple to the at least one axial motional mode of the one or more axial motional modes of the atomic object for a predetermined period.

6. The method of claim 5, wherein a sequence of causing the at least one first control signal to be provided to the at least one control electrode of the plurality of control electrodes and controlling the one or more manipulation sources to cause the cooling signals to be incident on the atomic object are performed repeatedly until a threshold temperature is achieved for the atomic object.

7. The method of claim 1, wherein the oscillating potential is a continuous oscillating potential, which is configured to cause the at least one radial motional mode of the one or more radial motional modes of the atomic object and the at least one axial motional mode of the one or more axial motional modes of the atomic object to hybridize.

8. The method of claim 7, wherein the at least one radial motional mode of the one or more radial motional modes of the atomic object and the at least one axial motional mode of the one or more axial motional modes of the atomic object are cooled at a same rate in response to the cooling signals being tuned to cause cooling of the second component of the second species of the at least two quantum objects.

9. The method of claim 7, wherein controlling the one or more manipulation sources to cause the cooling signals to be incident on the atomic object and causing the at least one first control signal to be provided to the at least one control electrode of the plurality of control electrodes are performed simultaneously.

10. The method of claim 7, wherein controlling the one or more manipulation sources to cause the cooling signals to be incident on the atomic object and causing the at least one first control signal to be provided to the at least one control electrode of the plurality of control electrodes are performed until a threshold temperature is achieved for the atomic object.

11. An apparatus comprising at least one processor and memory storing computer-executable instructions, the computer-executable instructions configured to, when executed by the at least one processor, cause the apparatus to at least:

control one or more voltage sources to cause a confinement apparatus to confine an atomic object at a position defined by the confinement apparatus, the confinement apparatus comprises (a) one or more radio frequency (RF) electrodes defining an RF null axis of the confinement apparatus and (b) a plurality of control electrodes, wherein the atomic object comprises at least two quantum objects, the at least two quantum objects comprising a first component of a first species of the at least two quantum objects and a second component of a second species of the at least two quantum objects, wherein motion of the atomic object at the position defined by the confinement apparatus comprises contributions from one or more radial motional modes of the atomic object and contributions from one or more axial motional modes of the atomic object;

cause at least one first control signal to be provided to at least one control electrode of the plurality of control electrodes, wherein the at least one first control signal causes the at least one control electrode to generate an oscillating potential at the position defined by the confinement apparatus and configured to cause at least one radial motional mode of the one or more radial motional modes of the atomic object to couple to at least one axial motional mode of the one or more axial motional modes of the atomic object or cause two radial motional modes of the atomic object to couple to each other such that motional energy is transferred from the at least one radial motional mode to the at least one axial motional mode or between the two radial motional modes, the two radial motional modes are perpendicular to each other, and the oscillating potential has a frequency that equals a frequency difference between the at least one radial motional mode and the at least one axial motional mode or a frequency difference between the two radial motional modes; and control one or more manipulation sources to cause cooling signals to be incident on the atomic object, wherein the at least one radial motional mode is dominated by motion of the first component of the first species of the at least two quantum objects and the cooling signals are tuned to cause cooling of the second component of the second species of the at least two quantum objects.

12. The apparatus of claim 11, wherein the at least one radial motional mode of the one or more radial motional modes of the atomic object are dominated by the first species of the atomic object and the at least one axial motional mode of the one or more axial motional modes of the atomic object are dominated by the second species of the atomic object.

13. The apparatus of claim 11, wherein the first species of the at least two quantum objects is configured for use as a coolant ion in a sympathetic cooling scheme for the atomic object.

14. The apparatus of claim 11, wherein the first species quantum object is a Yb ion, and the second species quantum object is an Ba ion.

15. The apparatus of claim 11, wherein the oscillating potential is a pulse oscillating potential, which is configured to cause the at least one radial motional mode of the one or more radial motional modes of the atomic object to couple to the at least one axial motional mode of the one or more axial motional modes of the atomic object for a predetermined period.

16. The apparatus of claim 15, wherein a sequence of causing the at least one first control signal to be provided to the at least one control electrode of the plurality of control electrodes and controlling the one or more manipulation sources to cause the cooling signals to be incident on the atomic object are performed repeatedly until a threshold temperature is achieved for the atomic object.

17. The apparatus of claim 11, wherein the oscillating potential is a continuous oscillating potential, which is configured to cause the at least one radial motional mode of the one or more radial motional modes of the atomic object and the at least one axial motional mode of the one or more axial motional modes of the atomic object to hybridize.

18. The apparatus of claim 17, wherein the at least one radial motional mode of the one or more radial motional modes of the atomic object and the at least one axial motional mode of the one or more axial motional modes of the atomic object are cooled at a same rate in response to the cooling signals being tuned to cause cooling of the second component of the second species of the at least two quantum objects.

19. The apparatus of claim 17, wherein controlling the one or more manipulation sources to cause the cooling signals to be incident on the atomic object and causing the at least one first control signal to be provided to the at least one control electrode of the plurality of control electrodes are performed simultaneously.

20. The apparatus of claim 17, wherein controlling the one or more manipulation sources to cause the cooling signals to be incident on the atomic object and causing the at least one first control signal to be provided to the at least one control electrode of the plurality of control electrodes are performed until a threshold temperature is achieved for the atomic object.

* * * * *